Feb. 10, 1931.  L. P. GREEN  1,791,526
SCRAPER
Filed Feb. 13, 1926   5 Sheets-Sheet 1
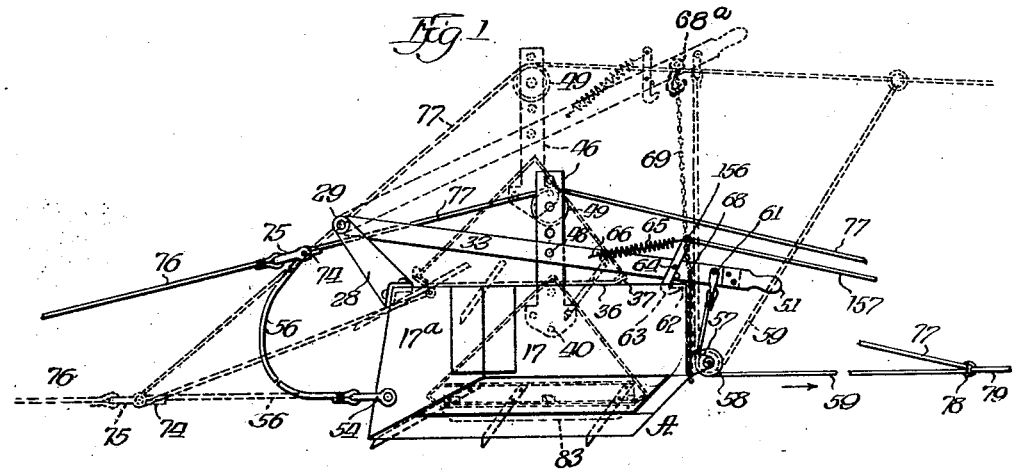
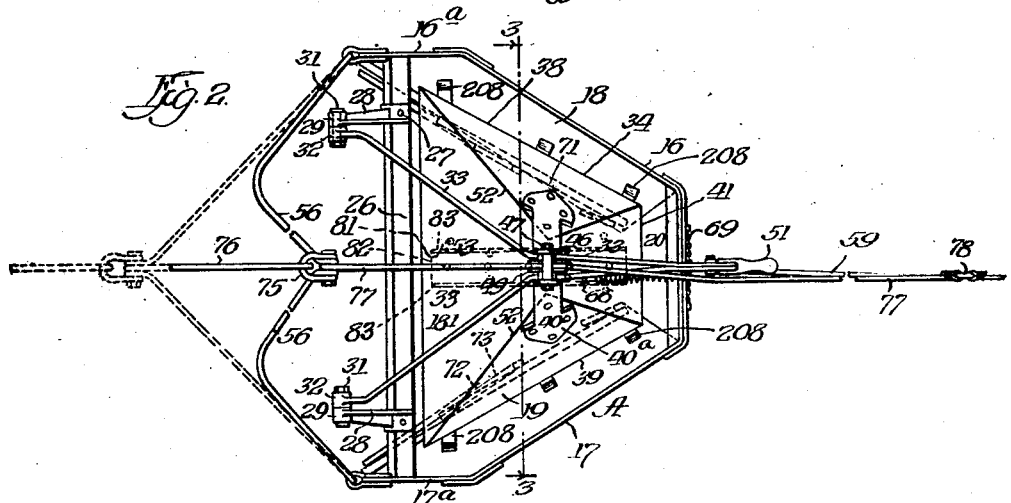
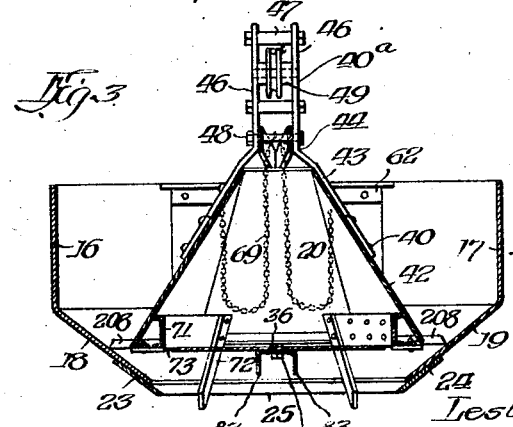
Inventor,
Leslie P. Green
By Ira J. Wilson
Atty.
Witness:

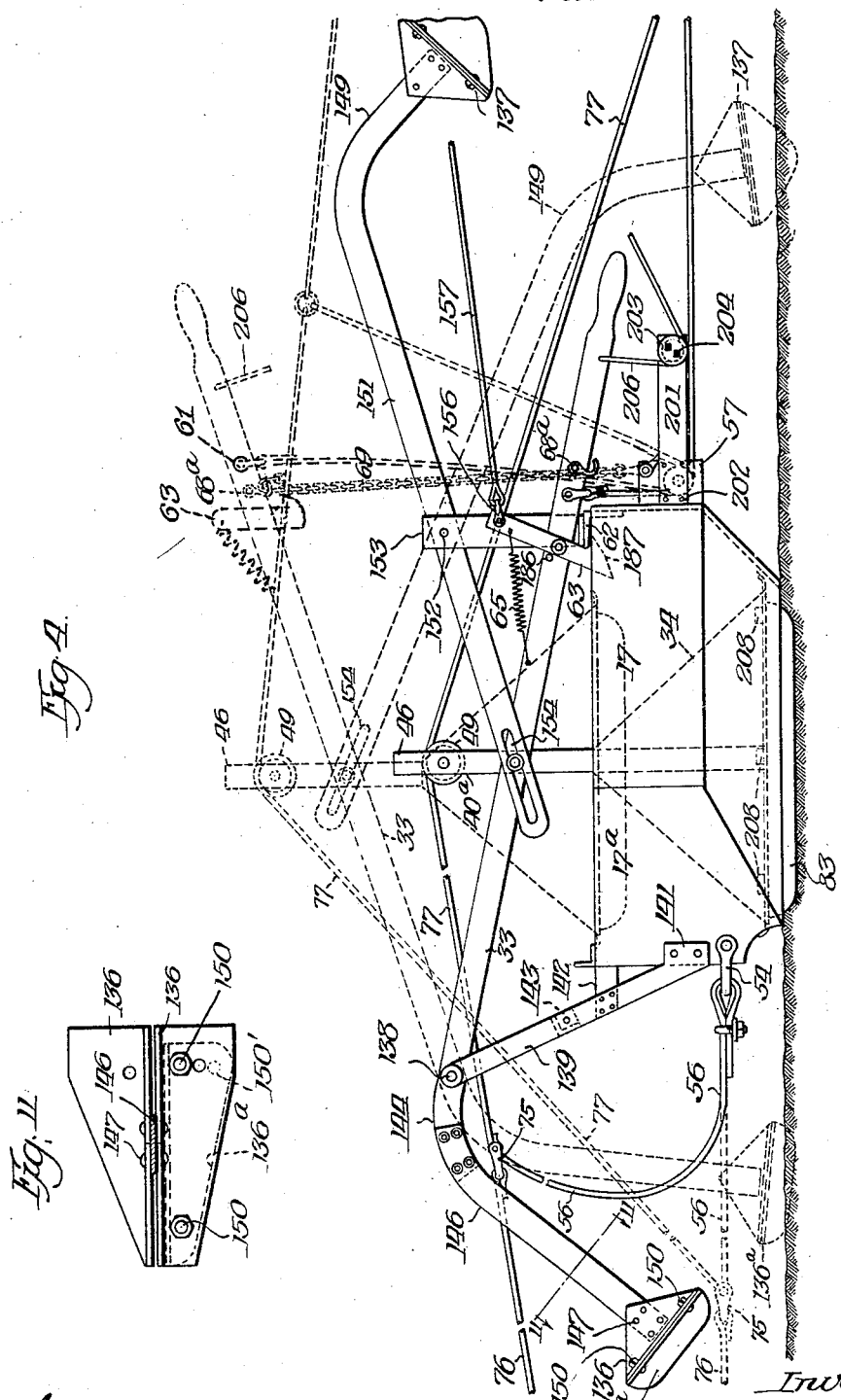

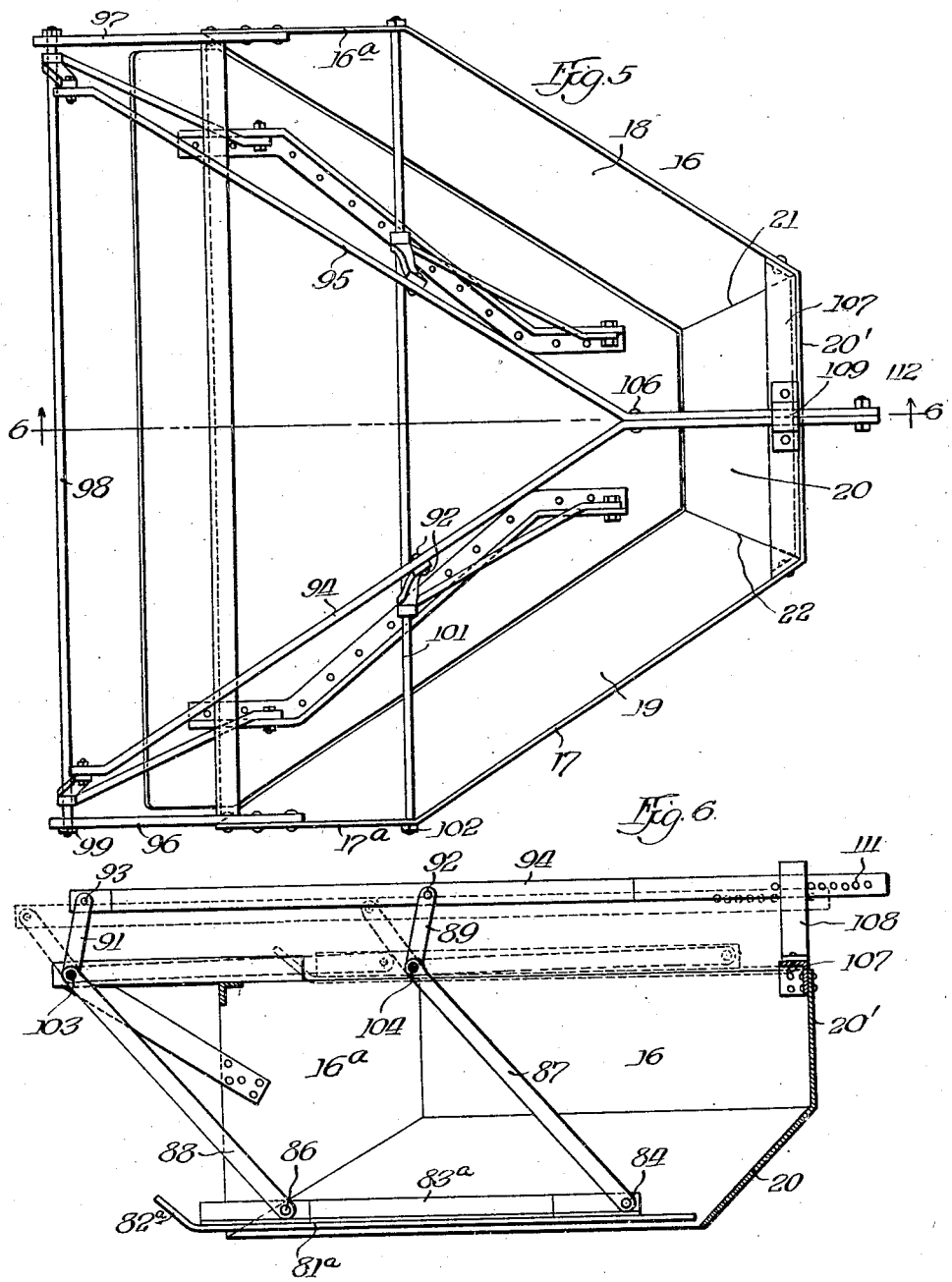

Feb. 10, 1931.  L. P. GREEN  1,791,526
SCRAPER
Filed Feb. 13, 1926   5 Sheets-Sheet 4
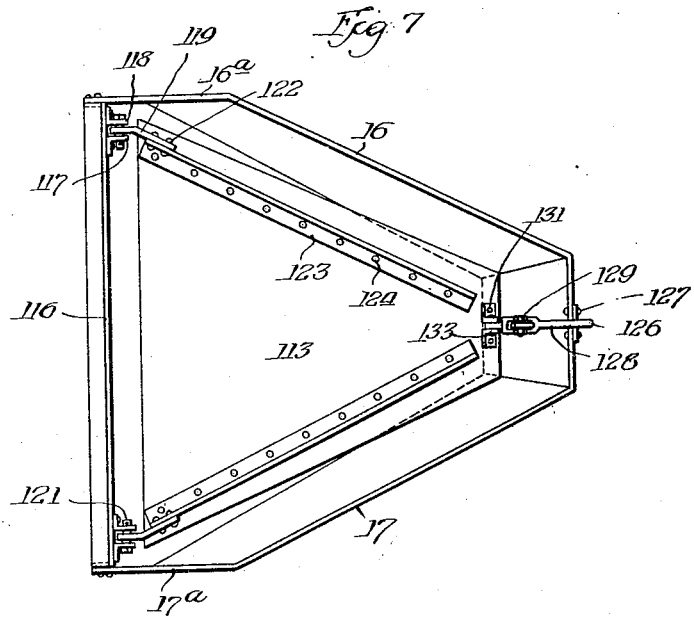
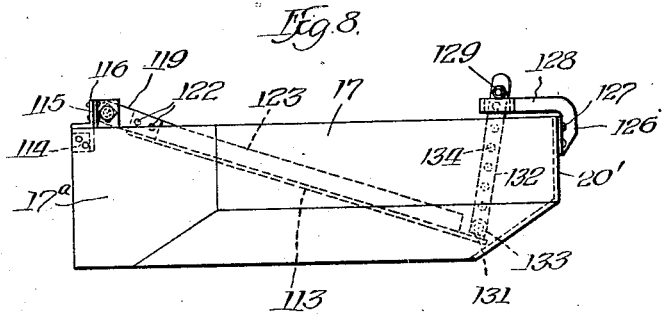
Inventor
Leslie P. Green

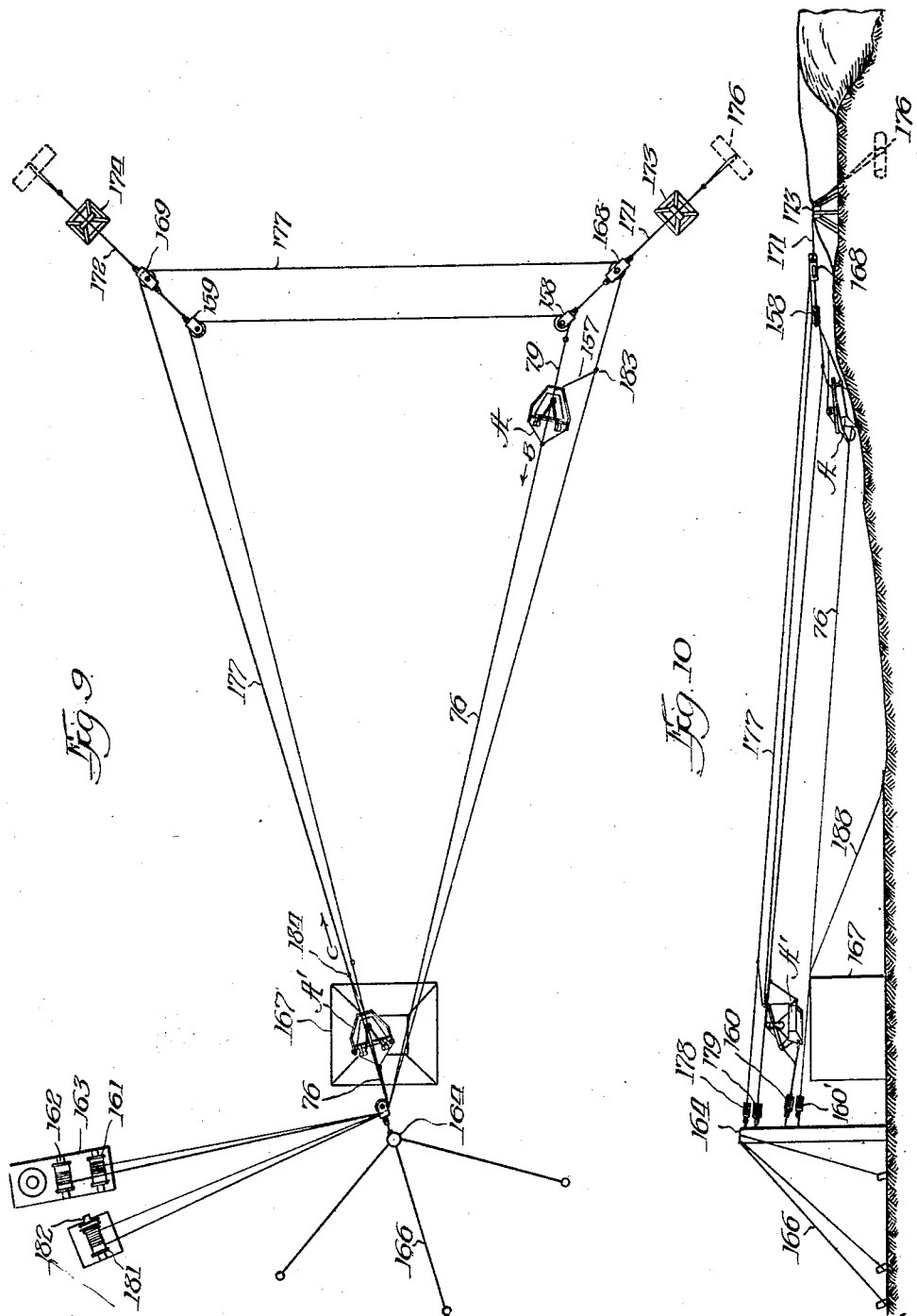

Patented Feb. 10, 1931

1,791,526

UNITED STATES PATENT OFFICE

LESLIE P. GREEN, OF CHICAGO, ILLINOIS, ASSIGNOR, BY MESNE ASSIGNMENTS, TO IRA J. WILSON, OF WINNETKA, ILLINOIS

SCRAPER

Application filed February 13, 1926. Serial No. 88,007.

My invention relates to scrapers of the drag type especially adapted for use in excavating work, stripping, leveling, etc., and is of the type known as the bottomless scraper, and this invention pertains particularly to the loading and unloading and the control of the same.

One of the objects of my invention is to provide a scraper simple in construction and of low cost, the load of which, or the amount of material permitted to be carried by the scraper, can be automatically controlled as desired.

Another object of my invention is to provide a scraper which, regardless of the position of the drag cables connected thereto, can be directed during the cutting operation at an angle to a line passing through the front and rear drag cables so that undermining can be readily obtained and the amount thereof predeterminedly fixed or changed without great loss of time or expense.

A further object of my invention is to provide a scraper which can be forward-dragged along any plane without collecting any material until the desired point of cutting, digging, and collecting is reached.

Another object of my invention is to provide means for automatically scraping the inner side and end walls of the scraper to remove substantially all the material therefrom at each time the scraper is dumped.

Still another object is to provide any type of bottomless scraper with a floating control member which will be raised by the action of the material entering the scraper to any predetermined height so that the amount of each individual load or cut of the scraper may be fixed by the operator to a substantial degree of accuracy.

A further object of my invention is to provide guiding means for guiding the filled scraper to a diverted point for dumping, independent of the location of the source of power.

Yet another object of my invention is to provide means for forcing the material from the interior of the scraper when the same is at a point where it is desired to dump the material. This is accomplished by means of forcing the load control member downward in the interior of the scraper and such action, assisted by the scraping members, will remove substantially all the collected material from the interior of the scraper.

Another object in this invention is to provide the scraper with mechanism for controlling from a distance the point at which the said scraper will take its load which permits the operation of a pair of scrapers in tandem and control of the same by the person operating the engine or other power means which is used for dragging the scrapers in their cutting and collecting operations.

Other objects and advantages of this invention will be manifest and can be readily understood and appreciated as the same becomes better disclosed by reference to the following description when considered in connection with the drawings.

Referring to the drawings:

Fig. 1 is a side view of my improved scraper showing the same in a position ready to be drawn forward, and the upper dotted lines in said figure show the position of the various parts after the scraper has been drawn forward and completely filled, Fig. 2 is a top plan view of the same, Fig. 3 is a vertical sectional view taken on the lines 3—3 of Fig. 2, Fig. 4 is an enlarged view of my scraper similar to Fig. 1 showing the guiding members or rudders attached to the scraper in both their raised and lowered position, Fig. 5 is a top plan view of a modified form for controlling or adjusting the floating load control member, Fig. 6 is a cross sectional view of the same on the line 6—6 of Fig. 5, Fig. 7 is a top plan view of another modified form of control member controlling substantially one-half of the capacity of the scraper, Fig. 8 is a side view thereof, Fig. 9 is a diagrammatic view of a double scraper system with remote control for fixing the point at which scrapers are loaded, and Fig. 10 is a side view of the same, and Fig. 11 is a detail plan view of the rudder member showing the arm to which it is attached in section.

Like symbols of reference herein indicate like parts in each of the figures of the drawing.

The scraper A, including all the parts and improvements which I have mentioned in the objects of this invention and which may be further disclosed by this specification, may be of any desired form, but for the purpose of illustration only, I have shown a scraper comprising two diverging side walls 16 and 17 having parallel forward ends 16ª and 17ª respectively, and a rear wall 20' extending transversely of the scraper and uniting the rear ends of the side walls, said end and side walls being preferably formed of a single sheet of suitably heavy metal cut and bent to the desired shape, although they may be formed separately and connected by rivets or bolts if desired. The lower portions of the side walls are bent inwardly as indicated by reference characters 18 and 19 and the corresponding portion of the rear wall 20' is bent forwardly as indicated by reference character 20, the metal below the bending line of these walls being cut away at the juncture of the rear and side walls, so as to provide tight joints along the juncture lines 21 and 22. Wear plates 23, 24, and 25 may be securely attached by rivets, bolts, or otherwise to the inclined portions 18, 19, and 20, respectively, of the side and rear walls, which wear plates project beneath the lower edges of the walls and end, as shown in Figs. 1 and 3 of the drawings, thus providing hardened cutting and scraping edges possessing greater durability under wear than the metal of which the walls themselves are formed and furthermore these wear plates can be removed and replaced by others when they become worn out or broken.

Extending across from the parallel forward ends 16ª and 17ª of the side walls 16 and 17 and attached at the upper forward ends of the same is an angle bar 26 to which are connected, at points near the said plates by means of suitable rivets or bolts 27, arms 28, at the outer ends of which are bosses 29. Connecting with each boss 29 by means of a pin or bolt 31 so as to form a pivotal connection therewith, is the boss 32 on the inwardly converging arms 33 which will be later explained.

Adapted to operate or float within the scraper A is a member 34 which may be termed a load control gate and which has a flat under surface provided with a plate 36 whose front and rear ends are preferably upturned as at 37. This plate is shaped preferably the same as the inside contour of the scraper A, having its sides 38 and 39 corresponding substantially with the sides 16 and 17, and its rear edge 41 corresponding substantially with the rear end 20', although of smaller size throughout than the area between the sides and ends above mentioned. Attached to each side of the bottom plate 36 of the member 34 by suitable means such as rivets, is a plate 42, and these plates extend upwardly and converge inwardly as shown in Fig. 3, and each has secured thereto by suitable rivets or bolts 40, at a position about half-way up the height thereof, a bracket plate 43, which said plates also converge in a line parallel with the converging sides of the plates 42, to the point 44, from which point they extend vertically and parallel to each other and such vertical portions are characterized by the numeral 46. The bucket as a whole is designated 40ª. These portions are suitably spaced from each other by means of spacing bolts 47, while the arms 33, before referred to, pass between the vertical portions 46 at a place near the point 44, and are held between said portions by means of the bolt 48. At a point between the spacing bolts 47, and shown on Figs. 1 to 4, is a sheave wheel 49, the purpose of which is hereinafter explained.

After the arms 33 have been secured between the upright portions 46, they are extended outwardly and fixedly secured in a slotted handle 51 or other member as desired. The plates 42, beside converging, as shown in Fig. 3, also have tapered front edges 52, tending toward an apex, and a plate 53 extending upwardly from the bottom plate 36, meets with the edges thereof, and its edges are joined thereto as well as with the front of the plate 36, so that the member 34 is, when completed, substantially pyramidal in shape and entirely closed on its front and side faces, although said front plate may be removed at will, as later explained. If desired, a plate may also be provided to close the rear of said pyramidal member.

At a point near the front of each of the side walls, 16ª and 17ª, and positioned near the bottom thereof, is a link member 54, to each of which is attached a cable 56, the purpose of which is later explained.

At the rear of the scraper is a bracket 57 in which a sheave 58 is located, and a cable 59 passes over the same and is attached to the link member 61 which is positioned on the arms 33 at a point near the handle 51. The inner side of the rear wall 20' is provided at the upper end thereof with an angle bar 62 with one flange of the same facing forward to engage the dog 63 which is pivoted at the point 64 to the arms 33, and the dog extends a considerable distance above the arms 33. A spiral spring 65 is connected with the end of said dog, by its one end, and with one of the side arms 33 on a pin 66 at a position considerably forward of the pivotal point 64 of the dog. At a position between the dog 63 and the link 61, a chain 69 is fastened on each of the arms 33 at the point 68, and these chains are connected to a hook (not shown) or suitable fastening member located at a desired point on the rear wall 20' of the scraper.

I prefer however, to obtain this limit control by providing the arm 33 with a grab hook 68ᵃ into which any link of the chain 69 may be connected, while the other end of said chain is securely fixed to the rear wall or to the bracket 57, as shown in Fig. 4. By this method of connection of the chain 69 to the grab hook 68ᵃ, it is possible to regulate and fix the amount or depth of the cut to any predetermined point, which feature alone presents novelty over any type of power scraper used at the present time.

A pair of channel bars 71 are located within the pyramidal member 34 and are fastened to the bottom plate in any suitable manner and extend along the entire side of each of the plates 42. These channel bars have a series of holes throughout the faces of the same, through which bolts, not shown, may be passed for bolting the teeth 72 thereto. These teeth extend downwardly through an opening 73 in the bottom plate 36 and run along the edge of each of the channel bars 71 and can be bolted on and removed at will through the front opening in the pyramidal member 34 when the front plate 53 is removed.

The cables 56 which are attached to the links 54 on the front of each side of the scraper are connected at 74 with a link 75, and the main forward drag cable 76 is connected with this link 75 for drawing the scraper forward when in the position shown in the dotted lines. Connecting also with the point 74 of the link 75 is another cable 77 which passes over the sheave 49 and is fastened to the cable 59 at the point 78, and both cables in turn fastened to the main rear drag cable 79.

At suitable points throughout the bottom plate 36 are a series of staggered holes 81 to which are attached, by bolts 82, a pair of guide members 83 which are preferably formed of channel bars and may be attached to the said plate so that the depending legs of the same will act as runners or guides parallel with a line drawn through the center of the front and rear cables or may be attached at an angle to the said center line in order to provide for undermining, as hereinafter explained.

The floating member 34 may, if desired, be provided with scraping members 208 adapted to extend outwardly at each side and rear of said member, and these scraping members may extend the full length of said sides and rear or a series of smaller units may be employed. I prefer that these members be normally urged outwardly by means of springs (not shown) so that when they fall between the tapered portions of the sides of the scraper they will be depressed so as to permit the said floating member to drop to its lowermost position. As the floating member is pivotally mounted on the arms 33 and to a certain degree loosely suspended therefrom, considerable agitation will be imparted to said member in its position within the sides and rear of said scraper and such action will bring the scraping members into contact with the sides and rear and will remove substantially all particles of material adhering thereto.

The operation of my improved scraper and particularly the form shown in Figs. 1, 2 and 3, is as follows: Let us consider the member 34 in its lowered position, as shown in Fig. 1, and the cables 56, 76, 77, and 59, in the position in which they are shown in the full lines. The bracket 40ᵃ is held in its lowered position by means of the dog 63 whose inner curved end or hook portion engages with the forwardly extending portion of the angle bar 62 so that by reason of the dog's connection with the arms 33, the bracket member 40ᵃ will be prevented from rising and the member 34 thus held in its lowered position.

The cable 76, upon being drawn forward, will straighten out the slack in the cables 56, and the cable 77, operating over the sheave wheel 49 in the bracket 40ᵃ will be drawn forward and slack pulled in the cable 59 at the rear of the device.

As soon as the scraper has reached the point where it is desired to cut and collect the material, the upper portion of the dog 63 is tripped, so as to disengage the hook portion from the forwardly extending portion of the angle bar 62, whereupon the scraper A, by its wear plates 23, 24, and 25, assisted by the teeth 72, will begin to cut the material and drag such cut material with it, so that the member 34 will be raised as the material enters beneath the same, and this amount of rise in the member 34 may be limited by the chain 69 connected with the arms 33.

Considering that the chain 69 has been so set as to permit the floating member 34 to rise to the top plane of the sides 16 and 17 of the scraper A, the parts will, at the time the scraper has been filled, assume a position such as shown by the dotted lines in Fig. 1. When the scraper is being dragged forward and the dog 63 is engaged with the bar 62 so as to hold the member 34 in its lowermost position, the depending legs on the guide members 83 will bite into the material to be cut and if said guide members have been placed at an angle to the center line drawn between the front and rear cables, the scraper proper will swerve from its direct path to the path in which it is directed by the said guide members, whether to the right or to the left, and as these guide members are always placed parallel to each other, double resistance to the forward drag will be had. In this manner, the apparatus may be used for off-center surfacing mining or for undermining by being diverted from its forward center line movement for surface mining and driven directly at an embankment or pile of material, for undermining, and when the floating member 34 has been raised from its lowermost position in the scraper A, the guide members 83 will cease to have any further effect upon the guiding of the scraper A, so that it will be drawn over into its former position and directly in line with the forward cable 66, and the rear drag cable 69.

Let us assume that the scraper has now been drawn to the place where it is to be unloaded, and the parts are in a position such as shown in the dotted lines in Fig. 1. It is now intended that the scraper should be unloaded and returned to its former position for loading. Power is exerted on the cable 79 which takes up the slack on the cable 77 and pulls slack on the cables 56. The scraper A is drawn rearwardly from over and around the material which it has carried, and the cable 59, being directly connected to the rear drag cable 79 passing over the sheave 58, pulls the arms 33 downward by reason of the pivotal connections at the point 61, and the floating member being pivotally connected to the said arms at the point 48 will consequently be drawn downward until all the material has been forced from said scraper, when, after the floating member has reached the bottom of the scraper so that its bottom plate rests upon the inwardly flared portions 18 and 19 and 20' of the walls 16, 17, and 20, the dog 63 has engaged, by its hooked end, the forwardly extending portion of the angle bar 62. The scraper A is now in a position to begin another operation of dragging and scraping.

The operation described is one where the material is sticky or moist, but where dry material is being scraped and conveyed, the cable 79 may be attached directly to the rear wall 20' of the scraper and the cables 59 and 77 may be omitted.

In the form of the scraper shown in Figs. 1, 2 and 3, the floating member or load control gate is shown in its preferred form, in that it is permitted to raise or lower approximately on a level with the surface over which it is operating.

By reference to Figs. 5 and 6, another form of control gate 81ª is shown, and this member has a forward upturned end 82ª for passing over the material to be collected, and is provided on its upper face with the angle bars 83ª to which are pivotally connected at the points 84 and 86 pairs of upwardly extending arms 87 and 88 having their off-center portions 89 and 91 pivotally connected at the points 92 and 93 with the adjusting bars 94 and 95. At both sides 16ª and 17ª of the scraper and at a position at the forward end thereof are arms 96 and 97 which extend beyond the front of the scraper proper and are connected by a long rod or bolt 98 which passes through the same and is provided with an ordinary nut 99 at each end of the same for holding the same in position. At the point on the sides of the scraper, just before the said walls start to converge, is another rod or bolt 101 which extends between the sides of the scraper and is held in position by means of nuts 102 located on each end of the same. The front rod 98 is adapted to pass through the arms 88 at the point 103, and the rod 101 is adapted to pass through the arms 87 at the point 104 so as to form a pivotal connection therewith. The arms 94 and 95 converge rearwardly, and are fastened together at the point 106 by a rivet or any other suitable means, and the rear wall 20' of the scraper is provided with an angle bar 107 to which is fastened a limiting member 108 which has an opening 109 through which the joined ends of the arms 94 and 95 pass. The joined ends of the bars 94 and 95 are provided with a series of holes 111 through which a bolt or other member is adapted to pass, so that the forward movement of the bars 94 and 95 will be limited by means of the bolt or other member, striking against the member 108. This bolt 112 may be placed in any one of the series of holes extending through the bars 94 and 95, so that the forward movement of the bars 94 and 95 can be adjusted as desired, and this limitation will likewise limit the movement of the load limiting plate 81ª, as can be readily seen by reference to Fig. 6.

In this form of scraper, the load limiting member 81ª will always rise horizontally, so that the load can be controlled to an exactness by a simple adjustment of the bolt 112 in the openings 111.

Figs. 7 and 8 show another form of load limiting member 113. The front walls 16ª and 17ª of the scraper are provided at the upper front ends of the same with an angle bar which is fastened between the same by means of the rivets or bolts 114, and to this angle bar I have fastened another angle bar 115, although a T-bar of proper dimensions can be used to eliminate the two angle bars. On the rear of the upwardly projecting leg 116 of the top angle bar, I fasten two small pieces of angle bars 117 and 118, with sufficient space between them to admit the bar 119 which is pivotally connected between the two plates by means of a pin 121, or any other suitable means. The bars 119 are rigidly connected by means of rivets or bolts 122 to angle bars 123 which are in turn securely fixed to the load limiting plate 113 by rivets 124. The rear wall 20' of the scraper is provided with an arm 126 which is fastened to said wall by means of the bolts or rivets 127, and has a portion 128 extending forward of the rear end of the said scraper, and this portion is provided with a slot 129, as later explained.

On the extreme rear end of the load limiting plate 113 is a bracket member 131 of any suitable construction, and adapted to have a limiting arm 132 pivotally connected therewith at the point 133. This limiting arm 132 has its free end extending upward and through the slot 129 in the portion 128, and it is provided throughout its length with a series of holes 134 into which a bolt or other member may be placed, in order to limit the distance which the said arm may extend upwardly through the opening 129. It will thus be seen that the load limiting plate 113 can be adjusted to take practically any load from 50% to 100% in this type of scraper, while in the type shown in Figs. 1, 2 and 3, and in Figs. 5 and 6, the scraper can be adjusted to take any amount of load from zero to 100%.

These particular types of scraper shown in Figs. 5 and 6, and 7 and 8, are provided with the ordinary forward and rear drag cables which I have deemed unnecessary to show, and can be hauled forward in the regular manner in which scrapers of this type are dragged at the present time.

Fig. 4 shows the same arrangement of parts as Figs. 1, 2 and 3, except that in this view, I show the scraper with front and rear rudders 136ª and 137 respectively, and other parts which may or may not be used with the device shown in Figs. 1, 2, and 3. Consider that the arm 33 is pivotally connected at the point 138 with an arm 139 which is fastened to the front of each side of the scraper at the point 141, and further secured by the plates 142 to the said sides, and by the angle bar or brace 143 extending between the arms 139, in order to provide sufficient rigidity for the same. One or both of the said arms 33 is extended beyond the pivotal point 138, and curved, as at 144, and joins at such point with an arm 146 to the outer end of which is fastened an angle plate or plates 136 to which I attach a rudder 136ª by suitable bolts 150. The front bolt 150 is stationary, while the rear bolt may be extended through any one of a series of holes 150' in order to throw the blade of the rudder off center to change the direction of travel of the scraper when the same is filled with material and dragged forward.

The rear rudder 137 is securely fixed to the downwardly extending portion 149 of the arm 151, and this arm is pivotally connected as at 152 with an upright member 153, secured to the rear wall 20' of the scraper by any suitable means, such as bolts or rivets. This arm 151 is connected with the upwardly extending arm 46 of the bracket 40ª by means of a slotted opening 154 in the forward end of the same, so that upon the rise of the floating members 34 to the position shown in the dotted lines in Fig. 4, the front rudder 136 will be rotated around the pivotal point 138, so as to lower the said rudder to the ground, while the rear rudder will be lowered through its pivotal connection 152 in the upright member 153. These rudders will be lowered slowly and the parts will assume the position shown by the dotted lines upon the forward movement of the scraper, after the dog 63 has been tripped to permit the member 34 to be raised by the admission of material beneath the same. The full distance which the member 34 is permitted to rise is governed by the chain 69, as explained in connection with the description of Figs. 1, 2 and 3.

It is evident that the dog 63 will prevent the scraper from performing any work on the material so long as it is in engagement with the angle bar 62 which holds the floating control member 34 in its lowermost position, and it is also evident that by the use of the chain 69, the limit of upward movement can be established, but so far no arrangement has been made to control the movement of the member 34 between the lowermost position and upward limited position. Unless some control is had between these two positions, the scraper is left to fill just as rapidly as the material can be cut and passed into the scraper to raise the member 34 to its limited position. This control I accomplish by attaching a plate or bar 201 to either the back of the scraper or to the bracket 57 as shown in Fig. 4 and by suitable bolts or rivets 202. The outer end of said bar has a winch head or drum barrel 203 rigidly mounted thereon, and is prevented from rotating by the bolts 204. A cable or rope 206 is attached in any suitable manner to the arm 33 and when the dog 63 is tripped to permit the member 34 to rise in the scraper the said rope or cable 206 is drawn taut and wrapped two or three times around the winch head from which it is gradually fed or played out to control the rise of the arm 33, and consequently the member 34.

At the upper end of the dog 63 is a link 156 to which is attached a cable 157. This cable will be found on Figs. 1 and 4, and its purpose will be understood in connection with the diagrammatic views shown in Figs. 9 and 10. In these views, I contemplate the use of two scrapers operating in tandem, which has heretofore been considered impractical in connection with drag scrapers. The principal objection to the use of two scrapers has been the inability to properly control the filling of the scrapers at the desired point. Various devices have been tried, but when the scraper is dragged forward, it loads immediately, and the material, for this reason, is all carried from one point. This will be readily understood when it is considered that the dumping point is most always in one position or at least in a position that changes very slowly, so that if two scrapers were being used, one scraper would always have to load at the same time the other scraper was releasing its load. This would prohibit any actual control of the point where either of the scrapers are to be loaded, which, of course, is absolutely necessary for efficient operation, and for that reason, the use of two scrapers has not been successful.

In my invention, I attach the drag cable 79 from the rear of the scraper around a guide block 158, thence to another guide block 159, thence to the rear of the other scraper. The forward drag cable 76 on each of the scrapers extends around a guide block 160 and 160', and thence to the drums 161 and 162. These drums form part of an ordinary friction drum hoist which I have designated by the numeral 163, and an operator is in control of the same. The guide blocks 160 and 160' are secured to a post or pillar 164 which is securely held in position by means of a series of guys and deadmen, 166.

At a suitable position in front of the guide blocks 160 and 160', I have placed a hopper 167, into which we will presume that the material from the scraper is to be dumped.

At a point a short distance beyond the guide blocks 158 and 159, are additional guide blocks 168 and 169, and these blocks are all held in position on cables 171 and 172 which pass over a suitable frame 173 and 174 respectively, and are preferably anchored on deadmen, as at 176, so as to keep the cables in taut condition at all times. Extending outside the cables 79 and 76, which are the drag cables for the scrapers, is a cable 177 which passes through the guide blocks 168 and 169 to suitable guide blocks 178 and 179, fastened to the pillar 164, and both ends of said cable are then connected in opposite directions over a loose running drum 181, which is provided with an ordinary brake 182 for the purpose hereinafter explained. It is in connection with this control that the cable 157 is adapted to be used. This cable, being connected as shown in Figs. 1 and 4, to the link 156 in the upper end of the dog 63, is fastened by its other end to any suitable point, such, for instance, as 183 on the cable 177 surrounding the drag cables, while I have indicated its connection on the other scraper by the character 184. Let us consider that the scrapers are in the position shown in Fig. 9 and it is desired to put the scrapers in operation by moving the scraper A in the direction shown by the arrow B and the scraper A' in the direction shown by the arrow C. As soon as the scraper A' commences its rear movement, it backs off the load which it has carried to the hopper 167, and the scraper A starts forward to gather a load. The cable 177, operating loosely, will be pulled around, and while one end is fed onto the drum 181, the other end will be fed off until such a time as the scraper B has reached the exact point where the operator desires to take a cut of the material. At that precise moment, he operates the brake 182 on the drum 181 which causes the cable 177 to cease its movement, and the scraper A, being positively drawn forward by means of the drum 162, the cable 157 will be pulled sharply by such action and will overcome the tension on the spring 65, thus disengaging the hooked end of the dog 63 from the forwardly facing flange of the angle bar 62, so that the floating control member is permitted to rise in the scraper and thus take its load from the point desired. When the dog is released, the operator immediately releases the brake, thus allowing the cable 177 to travel freely until such time as it is desired to load opposite scraper A'.

It will readily be seen that, by reason of the cable 59, passing through the sheave 58, and being connected to the link 61 on the arms 33, the material which is contained within the scraper will be pressed from the bottom of the same immediately power is placed on the cable 79 for taking up the slack which has been pulled in the cable 77. This downward movement of the arms 33 will again cause the hooked end of the dog 63 to engage with the forward leg of the angle bar 62 and thus lock the control member 34 in its lowered position in the scraper A. The action of the spring 65 on the dog 63 is limited by the pin 186 which is fixed in the arm 33, so that the tapered outer portion 187 on the hook of the hooked end of the dog will always be kept at a point forward of the extreme edge of the forwardly extending leg of the angle bar 62. The cable 59 may be dispensed with when the material being cut and collected is dry, as in such case it will readily fall from the scraper without any resistance and the member 34 will fall to the bottom of the scraper of its own weight when the material is removed.

It will be apparent, of course, that the hopper which I have shown and designated by the numeral 167, is only shown to illustrate how the scrapers can be dragged to a position over a hopper, and up an incline 188 which may be composed of the material itself, or may be an inclined platform leading to the hopper, but the scraper may merely convey the material from the point at which it is cut and collected to another point for filling, in which case no hopper or other device would be necessary. The loose running drum 181 is not connected in any way with any power or other means and is provided with a brake 182, as explained, for the purpose of stopping the travel of the cable 177, and thus tripping the dog 63 through the cable 157. This drum has no other purpose than feeding and stopping the cable 177. The friction drum hoist 163 may be of any approved type, and the drums 161 and 162 are supplied with power therefrom for dragging the scrapers forward through the means of their front cables 76 and returning them through the cables 79.

While I have shown and described this automatic control of the load control member, it will be readily understood that an operator may be placed at any point where it is desired that the scraper shall take its fill, and he may trip the dog 63 so that the two scrapers could be operated without the use of the outer cable 177, but its use would eliminate the necessity of having an operator along the line of travel of the scrapers, and a single man, stationed beside the friction drum hoist 163 and in a position to operate the brake 182, could control both scrapers.

It is believed that my invention, its mode of operation, the advantages thereof, and preferred apparatus for carrying the same into effect, will be readily understood from the foregoing without further description, and it also should be manifest that the invention is capable of forming a wide range of variations without departing from the scope thereof as defined in the following claims.

I claim:

1. A bottomless scraper having a floating plate so adjustable that the quantity of material permitted to enter said scraper may be fixed at any point from zero to one hundred per cent capacity.

2. In a bottomless scraper, a floating top member initially preventing any material from entering said scraper, means for permitting the rise of said floating member at any desired point in its travel, and means for preventing further rise of said member when the scraper has received a predetermined quantity of said material.

3. The combination with a bottomless scraper, of a floating member adapted to swing upwardly when actuated by the material entering the scraper, and downwardly when actuated gravity as the material leaves the scraper, and means for limiting the movement of said floating member to predeterminately regulate the quantity of material carried by said scraper.

4. The combination with a bottomless scraper of floating means adjustably mounted therein for regulating the quantity of material to be carried by said scraper.

5. The combination with a bottomless scraper, of a floating member for predeterminately regulating the amount of material to be carried by said scraper, and means for controlling the depth of cut of said scraper.

6. The combination with a bottomless scraper, of means adjustably mounted for predeterminately regulating the quantity of material to be carried by said scraper, and means operatively connected with said first named means and said scraper for controlling the depth of cut of said scraper.

7. The combination with a bottomless scraper, of means adjustably mounted for predeterminately regulating the quantity of material to be carried by said scraper, and a manually controlled arm operatively connecting said first named means and said scraper for regulating the depth of cut of said scraper.

8. The combination of a bottomless scraper having a floating member normally adapted to rest at the bottom of the scraper and rise upward as the material enters said scraper, and means operatively connecting said floating member with the body of the scraper and adapted to exert a downward pressure on said floating member to restrain the speed of the upward rise of said floating member, thereby regulating the speed at which the material will enter said scraper when loading.

9. The combination with a bottomless scraper, of a floating top for regulating the quantity of material to be carried by said scraper, and means positioned on said floating top for digging the material to be carried.

10. The combination with a bottomless scraper, of a floating top for regulating the quantity of material to be carried by said scraper, and digging teeth positioned on said floating top for digging the material to be carried thereby.

11. The combination of a bottomless scraper, a floating member suspended between the walls thereof and normally adapted to rest on the material to be carried, means positioned on said floating member for loosening the material to be carried, said floating member and means being adapted to rise upwardly by the pressure of the material entering said scraper as it is dragged forward and adapted to lower to its normal digging position when the scraper is emptied as it is dragged rearwardly.

12. In combination with a bottomless scraper of floating means attached forward of the digging edge of the scraper and means on said floating means for loosening the material to be conveyed by said scraper, said loosening means being adapted to rise upward as the scraper fills.

13. The combination with a bottomless scraper, of a floating top for regulating the quantity of material to be carried by said scraper, and means on said floating top for guiding said scraper when loading.

14. The combination with a bottomless scraper, of a floating top for regulating the quantity of material to be carried by said scraper, and adjustable guiding means on the lower side of said floating top for directing the cut by the scraper when loading.

15. The combination with a bottomless scraper having a forward drag cable, of a floating member therein for regulating the quantity of material to be carried by said scraper, and means controlled by the position of the said floating member to throw said scraper out of line with the direction of pull of said drag cable to permit said scraper to take its load of material at said out of line point.

16. The combination with a bottomless scraper having a forward drag cable, of a floating member therein for regulating the quantity of material to be carried by said scraper, and means controlled by the position of said floating member to throw said scraper out of line with the direction of pull of said drag cable to permit said scraper to take its load of material at said out of line point, said means being so mounted as to permit the scraper to be thrown back into line with said drag cable when filled.

17. In combination with a bottomless scraper having a forward drag cable, of a floating member and means on said floating member to throw said scraper out of line with the direction of the pull of said drag cable to permit said scraper to take its load at said out-of-line point.

18. The combination with a bottomless scraper, of a floating top for regulating the quantity of material to be carried by said scraper, of means carried by said floating top for engaging with and scraping the side walls of said scraper.

19. The combination with a bottomless scraper, of a floating member therein normally adapted to prevent the entrance of material to said scraper during its forward dragging movement, and means for preventing material from lodging on said member.

20. In a bottomless scraper, a floating plate adapted to limit the quantity of material to be carried by said scraper, guide members on said plate for directing the cut by the scraper and adapted to be raised from guiding position as the material raises said plate, and other guiding means adapted to guide the scraper to the point of dumping after it has been filled to its predetermined capacity.

21. The combination with a bottomless scraper, of a floating member for predeterminately regulating the amount of material to be carried by said scraper, and means for forcing said floating member downward to discharge the material from said scraper.

22. In a bottomless scraper, a floating member, a dog adapted to hold said member in its lowermost position to prevent the entrance of any material into said scraper, said dog being adapted to be tripped at any desired point for permitting said floating member to rise thereby allowing material to enter said scraper, and means for preventing further rise of said member when the scraper has received a predetermined quantity of said material.

23. The combination with a bottomless scraper, of a floating member for predeterminately regulating the amount of material to be carried by said scraper, a dog locking said floating member in the bottom of said scraper for normally preventing the entrance of material into said scraper, and a cable attached to said dog for forcibly tripping the same to permit said floating member to rise in said scraper and take its load when the same has reached the desired point of filling.

24. The combination with a bottomless scraper, of a floating member for predeterminately regulating the amount of material to be carried by said scraper, means normally preventing the rise of said floating member in said scraper, front and rear drag cables connecting said scraper, a loose running cable, a cable connecting said means and said loose running cable, and external means for momentarily stopping said loose running cable whereby said first named means is released to permit said scraper to be loaded at any desired point.

25. In an excavating apparatus, the combination with a plurality of bottomless scrapers, of load control means mounted on each scraper normally preventing said scraper from loading, and means to release the load control means at will, thereby controlling each scraper to take its load at the most advantageous point in the operation.

26. In an excavating apparatus, the combination with two bottomless scrapers of load control means adjustably mounted on each scraper normally preventing the scraper from loading, a remote power unit, means to limit the amount of load carried in each scraper, a forward drag cable attached to the forward part of each scraper, a rearward drag cable attached to one scraper passing through sheaves adapted to be anchored at the rear of the area being excavated, and attached to the other scraper, and means to alternately release the load control member, on either of said scrapers at will, thereby controlling each scraper to take its load at the most advantageous point in the operation.

27. In an excavating apparatus, the combination with a plurality of bottomless scrapers, of load control means mounted on each scraper, normally preventing the scraper from loading and means to release the load control means at the will of the operator, thereby controlling each scraper to take its load at the most advantageous point in the operation, and means to limit the amount of load carried in each scraper.

In witness of the foregoing I affix my signature.

LESLIE P. GREEN.